June 28, 1966  W. J. BOLLINGER ETAL  3,258,230
HIGH SPEED DELIVERY CONTAINER
Filed July 22, 1964  2 Sheets-Sheet 1
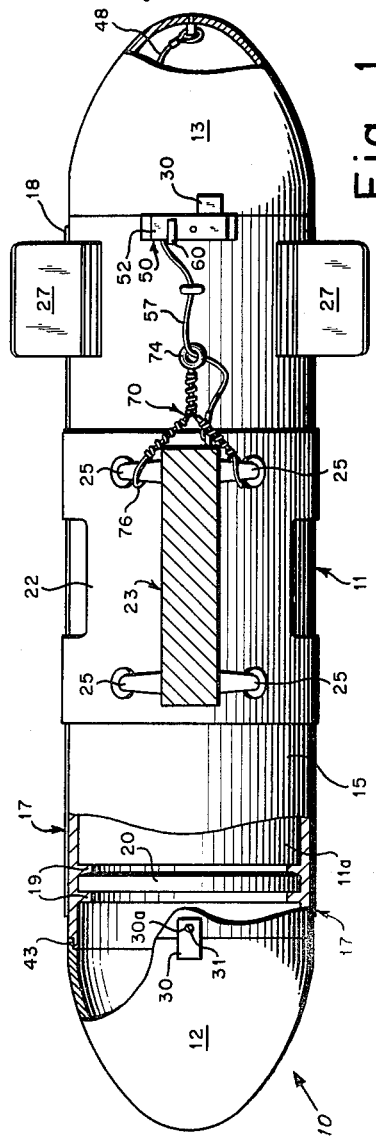
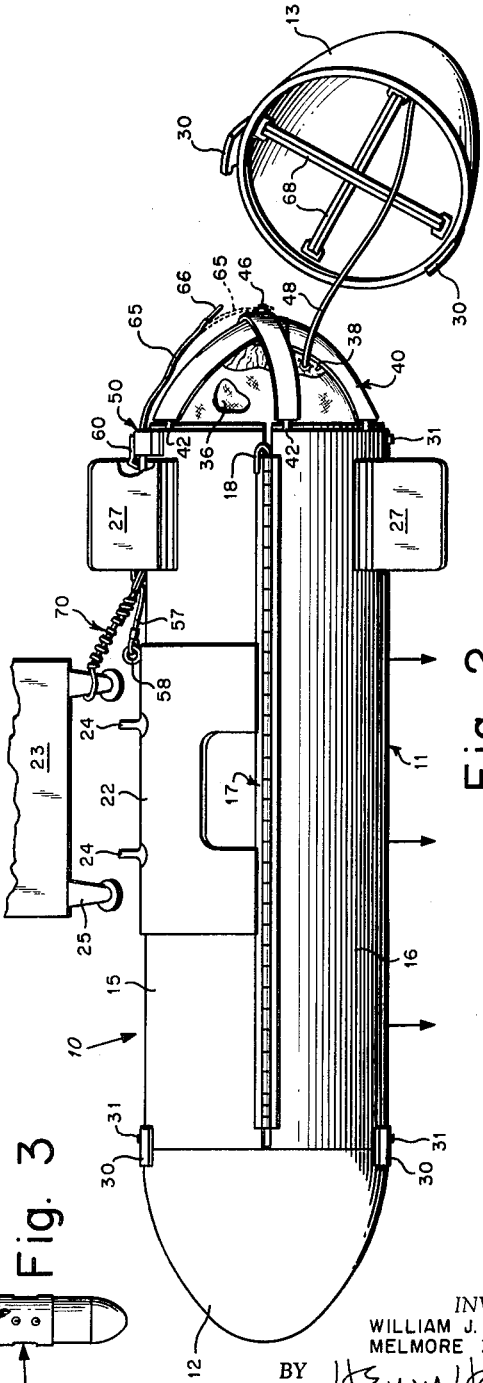
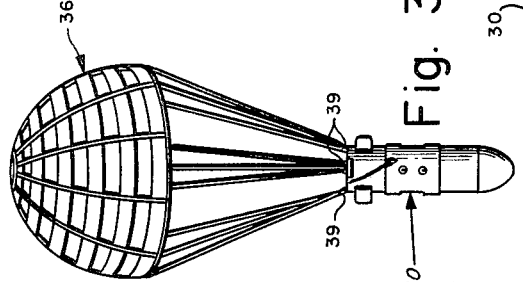
INVENTORS
WILLIAM J. BOLLINGER
MELMORE ZUGERMAYER
BY
ATTORNEYS June 28, 1966  W. J. BOLLINGER ETAL  3,258,230
HIGH SPEED DELIVERY CONTAINER
Filed July 22, 1964  2 Sheets-Sheet 2

INVENTORS
WILLIAM J. BOLLINGER
MELMORE ZUGERMAYER
BY
ATTORNEYS

United States Patent Office 3,258,230
Patented June 28, 1966

3,258,230
HIGH SPEED DELIVERY CONTAINER
William J. Bollinger, Glenside, and Melmore Zugermayer, Southampton, Pa., assignors to the United States of America as represented by the Secretary of the Navy
Filed July 22, 1964, Ser. No. 384,559
11 Claims. (Cl. 244—138)

The invention described herein may be manufactured and used by or for the Government of the United States of America for governmental purposes without the payment of any royalties thereon or therefor.

The present invention relates to containers used in dropping supplies from airborne vehicles and more particularly to delivery containers ejected from airborne vehicles flying at high speeds and low altitudes.

It is presently desired to eject cargo-carrying containers from the bomb ejector mechanisms housed on high-performance jet aircraft. Present delivery containers, developed for dropping from lower performance aircraft, and not for powered ejection therefrom, have been found unsuitable for use in these new environments in which the containers are to be used.

Air-dropped cargo containers presently employ a tail cone assembly for holding a parachute, the parachute being used to restrain the speed of descent of the containers. The tail cone is locked on the container until the latter is dropped from the aircraft and the cone is then released by a cord attached to the aircraft whereupon the parachute is freed for opening. Many mechanisms have been employed for locking the tail cone in the closed position until the container is dropped and for subsequently releasing and separating the tail cone therefrom. However, when the container is ejected as, for example, by cartridge power and when the ejection occurs at very high speeds due to the use of the container on high performance aircraft, the mechanisms for holding and releasing the tail cone have been ineffective. This is due to the adverse pressure distribution which tends to make the tail cone cling to the remaining portion of the container after it has been separated a short distance. The tail cone must be forcibly separated and completely free of the parachute to enable reliable operation.

The general purpose of the present invention is to provide a stable cargo container of the air-dropped type having a more satisfactory arrangement for locking the tail cone until the container is dropped from the aircraft and for releasing the tail cone and ejecting the same from the remaining portion of the container in order to free the parachute for deployment and to thereby retard the descent of the container.

In the present invention, the container is adapted for connection to the bomb rack of an aircraft. The container per se is provided with an area in the body portion thereof for receiving a parachute pack. This parachute pack includes a main parachute, a deployment bag encompassing the main parachute, and a pilot chute attached to the deployment sleeve. The pilot chute in turn is appropriately connected to a tail cone assembly so that upon disengagement of the latter from the container by actuation of the novel tail cone release mechanism, the pilot chute is released and withdraws the sleeve from the main parachute or canopy whereupon the latter opens and decreases the rate of descent of the container. A snood or safety device restrains the parachute pack when the same is housed within the body portion of the container and is released upon operation of the release mechanism. Should the tail cone be accidentally disengaged from the container while in flight, the parachute pack including the pilot chute will be retained by the snood assembly and the connecting cord between the tail cone and the pilot chute broken. This insures the non-deployment of the parachute while the container is still secured to the aircraft and thereby precludes the deleterious condition which might otherwise occur.

It is an object of the present invention to provide a cargo container which is ejected from an aircraft operating at high speeds and low altitudes.

An additional object of the present invention is to provide a high speed delivery container which is structurally adequate and aerodynamically stable when subjected to the accelerations experienced during forcible ejection thereof from a high speed aircraft.

Another object of the present invention is to provide means for reliably separating the tail cone from the body of an air dropped, high speed, cargo container to thereby obtain reliable operation of the parachute.

A still further object of the present invention is to provide a tail cone release and ejector mechanism which would effect a more definite separation of the tail cone from the center section and which would be capable of sustaining the accelerations caused by explosive separation from the aircraft.

Still another object of the present invention is to provide a safety device within the container assembly for insuring the nondeployment of the container parachute upon accidental ejection of the tail cone from the container.

An additional object of the present invention is to provide a release mechanism for the tail cone latch assembly which is prohibited from engaging any portion of the aircraft thereby precluding any damage thereto.

Other objects and features of the invention will become apparent to those skilled in the art as the disclosure is made in the following description of an embodiment of the invention as illustrated in the accompanying sheet of drawing in which:

FIG. 1 is a top view of the cargo container and the bomb ejector associated therewith.

FIG. 2 is a side view of the cargo container immediately after ejection by the bomb rack.

FIG. 3 is a view of the container with the parachute secured thereto in a deployed condition.

Figure 4:
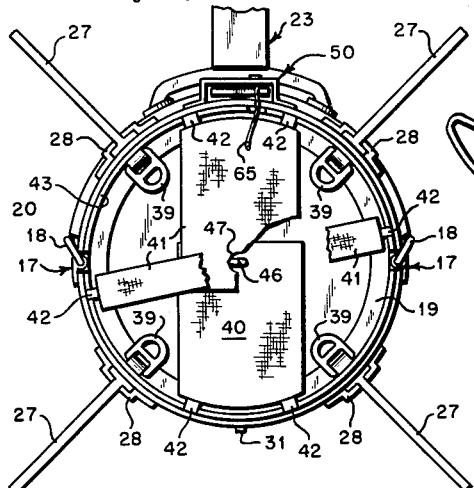
FIG. 4 is a rear end view of the container with the tail cone and parachute pack removed.

In the illustrated embodiment of the invention and first referring to FIG. 1, the cargo container generally noted at 10 is illustrated as comprising a central body section 11 for housing the cargo 11a to be supplied to the ground elements, a nose cone assembly 12 and a tail cone assembly 13. As more clearly indicated in FIG. 2, the central section 11 comprises upper and lower semi-circular body elements 15 and 16. These elements are connected along the longitudinal edges thereof by a conventional hinge assembly 17, only one such assembly being shown in FIG. 2, to thereby form the hollow cylindrical body 11. A hinge pin 18 formed as part of the hinge assembly 17 maintains the body elements 15 and 16 in the assembled position and removal thereof will provide ready disassembly and access to material stored within the confines of the circular elements. A pair of longitudinally spaced flanges 19 are formed adjacent each end of the central body portion 11, only one such pair being shown in FIG. 1, and serve as receivers for bulkhead 20 which forms the ends of the hollow container 11. Although the central body portion 11 is preferably formed of aluminum, it is understood that fiber glass or any appropriate lightweight high strength material may be utilized.

A hard back or reinforcing element 22 is secured to the upper half of the container 11 to resist ejection forces and sway brace loads applied by the ejector generally indicated at 23 and secured to an aircraft, not shown. The ejector is formed with hooks, not shown, for engaging lugs 24 on the strong back 22 and further includes sway braces 25 for engaging the strong back 22. The ejector 23 may be of the type generally known and used in the art for ejecting bombs or other stores from an aircraft and for purposes of the present embodiment is of the cartridge actuated type with the internal mechanisms not shown since the ejector forms no part of the present invention.

As more clearly illustrated in FIG. 4, a plurality of radially extending fins 27 are removably interlocked within channels 28 formed on the aft portion of the central section 11 and act as stabilizing means for the container 10 from the time of ejection until parachute deployment.

The nose cone assembly 12 is formed of aluminum or other appropriate lightweight material which will provide a shock absorbing function upon engagement with the ground surface. Cone 12 is provided with a pair of diametrically opposed latch blocks 30 which overlap the central section 11 and have apertures 30a formed therein engaging appropriately formed and positioned locking pins 31. Similarly, FIG. 2 illustrates the tail cone assembly 13 with latch blocks 30 formed thereon with the lower latch block having an aperture 30a for engaging the locking pin 31 formed on the lower portion of semicircular element 15. A latching mechanism generally noted at 50 engages and locks an upper latch block 30 formed on the tail cone assembly 13, this arrangement being described in greater detail below.

A parachute pack generally indicated at 35 extends outwardly of the aft bulkhead 20 and includes a main parachute 36, a deployment sleeve 37 and a pilot parachute 38. The main parachute 36 is of the ring-slot type wherein as illustrated in FIG. 3, the canopy is of flat circular design consisting of wide, concentric, cloth strips with intervening air slots and since this type of parachute is well known and used in the art, further description thereof is not considered necessary. The deployment bag 37, also known in the art, is a container usually of fiber in which the parachute canopy is stowed for deployment. By thus retaining the drag producing surface of the canopy until the suspension lines are deployed, and by allowing the acceleration of the canopy mass in small increments only, a reduction in snatch force is obtained. The pilot chute 38 functions to lift the deployment bag away and extract it from the parachute pack whereby the suspension lines are extended before the drag producing surface emerges from the deployment bag. As illustrated more clearly in FIG. 4, the main parachute canopy is connected by suspension lines to D rings 39 hingedly secured to the aft section of the central body section 11.

Referring now to FIG. 2 and particularly to FIG. 4, a parachute snood or safety device 40 is employed to preclude deployment of the parachute 36 prior to ejection of the container 10 from the aircraft. Safety device 40 includes a plurality of flexible straps 41, each having hook type fasteners 42 at one end thereof. The outermost end of the semicircular elements 15 and 16 are formed with circular lip portion 43 spaced radially inwardly of the semicircular elements 15 and 16. Slots 44 are formed in the lip portion 43 and fasteners 42 pass therethrough. The other end of one of the flexible straps 41 includes a transverse ring 36 while the remaining other ends of the flexible straps 41 include aperture 47 through which ring 46 passes when the straps 41 are placed in an overlapped position about the parachute pack 35. Ring 46 receives through an aperture formed therein a pin 66 which forms part of the locking or latch mechanism 50, to be described below.

A cord 48 is appropriately interconnected between the tail cone 13 and the pilot chute 38. As can be readily seen, when the tail cone 13 is released by the latch mechanism 50 and the safety device 40 is simultaneously released by pin 66, the tail cone pulls the pilot chute 38 into the slip stream by means of the cord 48 tied between them. The pilot chute 38 in turn initiates deployment of the main parachute 36 through deployment bag 37.

The novel latch mechanism for locking and ejecting the tail cone assembly 13 from the central body section 11 is best described with reference to FIGS. 1, 6a and 6b. The tail cone release and ejection mechanism 50 includes a channeled shaped housing member 52 having a pivot pin 53 secured between the flange 54 of the channel member 52 and the central body section 11. The pin 53 is located adjacent the aft end of the central body section 11 and pivotally connects a lever trip arm generally noted at 55. Trip arm 55 comprises a camming surface 55a for engaging the flat end portion of latch block 30 when the trip arm 55 is rotated to the release and ejected position illustrated in FIG. 6b. In the locked position of FIG. 6a, a lug hook 55b rigidly engages a lug 30b and thereby retains the tail cone assembly 13 securely to the central body section 11. A jettison cable 57 is secured at one end thereof to an eye hook 58 secured to the strong back 22 and is looped at the other end thereof about a cable hook portion 55c of the trip arm 55. The jettison cable 57 is maintained in the looped position about the cable hook 55c when the lever trip arm 55 is in the latched position by a spring clip 59. Clip 59 permits the jettison cable 57 to be removed from the cable hook 55c when the latch is in the ejected position of FIG. 6b.

Figure 6A:
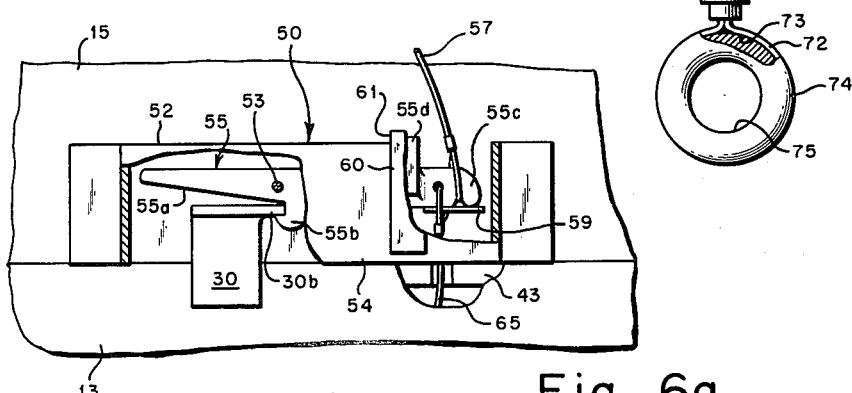
FIG. 6a is a detailed view partially in section of the novel latch mechanism in the latched position.
Figure 6B:
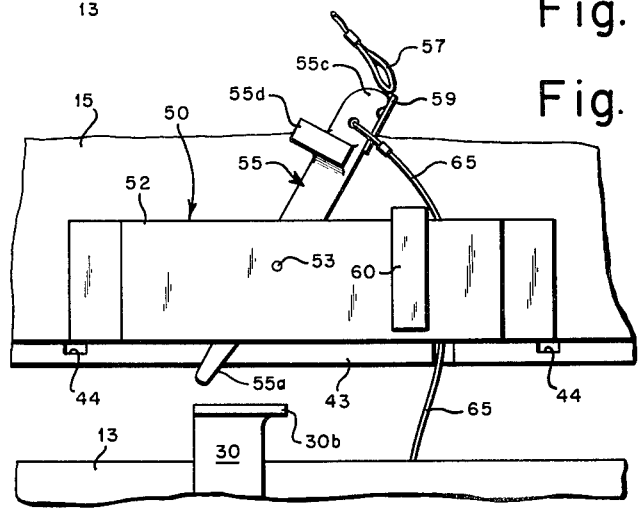
FIG. 6b is a detailed view partially in section of the novel latch mechanism in the unlatched position.

In order to retain the trip arm 55 in the latched position of FIG. 6a, a leaf spring 60 is secured to the web portion 54 of the channel housing 52 and includes a depending edge 61 which engages a flanged camming surface 55d on the trip arm 55. Leaf spring 60 is of sufficient strength and the engagement of the edge portion 61 with flange 55d is such that a large predetermined force must be applied to jettison cable 57 to cause the trip arm surface 55d to cam the leaf spring out of engagement therewith and to thereby permit the trip arm 55 to rotate about pivot pin 53 and eject the tail cone assembly 13.

Also secured to the trip arm 55 is a snood release cable 65 having the end thereof remote from the trip arm 55 formed with a pin 66 formed for engagement within the ring 46 of the flexible strap 41.

In order to aid the separation of the tail cone assembly 13 from the remaining portion 11 of the container 10 a plurality of elastic spring members 68 are secured diametrically of the nose cone 13 adjacent the open end thereof. As viewed in FIG. 2, when the nose cone is placed over the parachute pack 35 and the nose cone assembly 13 latched to the central body section 11 of the container 10, the elastic spring members 68 are forced toward the nose of the cone 13 and are thereby significantly tensioned. Upon unlatching of the tail cone assembly, the restoring force of the spring members 68 aids in the ejection of the nose cone assembly from the remainder of the container 10.

As may be readily observed from the above arrangement of parts, a pulling force applied to a jettison cable 57 will urge the trip arm 55 to rotate about the pivot pin 53 in a counterclockwise direction as viewed in FIG. 6a. A sufficiently applied force will cause the surface 55d to cam the leaf spring 60 out of engagement therewith and permit the aforesaid rotation. Continued rotation will simultaneously disengage hook 55b from the lug 30b and cause camming surface 55a to sharply engage latch block 30 and urge the same outwardly from the central body section 11. Simultaneously the snood release cable 65 will be pulled in such a manner as to release pin 66 formed thereon from engagement with ring 46 thereby releasing the snood or safety device 40. Continued outward movement of the tail cone assembly 13 from the central body section 11 causes cord 48 to urge the pilot chute 38 into the slip stream, the pilot chute in turn initiating the deployment of the main chute 36 as described above. The tail cone assembly 13 together with pilot chute 38 and deployment sleeve 37 separate as a unit from the main chute 36 and the remaining portions of the container 10 secured thereto. Until full deployment of the main parachute 36, fins 27 stabilize the container 10 and permit a clean separation from the aircraft and restricts the container from gyrating while the main parachute 36 is deploying. Once the main chute is deployed to the reefed condition, which occurs at an extremely short interval after ejection, the fins no longer serve a stabilizing purpose. The container parachute assembly as viewed in FIG. 3 and the shock force, when the container engages the ground surface, is absorbed by the nose cone 12. The container 10 is then quickly disassembled by slidably removing the hinge pin 18 which breaks the container into two accessible segments thereby facilitating removal of equipments contained within the container 10.

Figure 5:
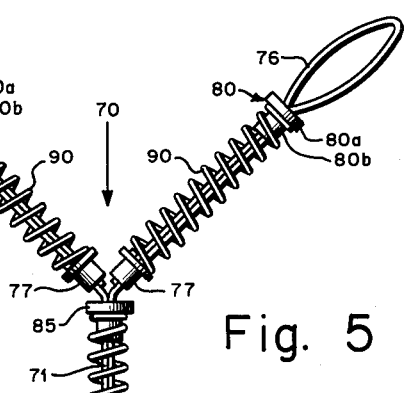
FIG. 5 is a detailed view of the trip cable of the present invention.

In order to initiate the pulling force necessary to release and eject the tail cone assembly 13 and to further insure that no significant structure is retained on the aircraft after ejection of the cargo container 10, since this structure may severely damage the aircraft, a novel trip cable generally noted at 70 is employed and will now be described. With particular reference to FIG. 5, the trip cable 70 is constructed of a single length of cable 71 and is formed with a loop 72 at the mid portion thereof. Loop 72 engages within and encircles a groove 73 formed on the periphery of a ring 74 and is clamped at 72a to retain the ring 74 and loop 72 is fixed relationship. Ring 74 is formed with an interior smooth convex surface 75, the ring being formed of a light weight material such as aluminum or the like.

The two ends of the cable 71 are further looped to form a pair of sway-brace-engaging loops 76. Each of the ends of cable 71 are rigidly clamped by fittings 77, such as Micropress fittings or the like, and interposed between each of the fittings 77 and the respectively formed loops 76 and slidably encompassing the cable 71 is a pair of fittings 80 comprising a flange 80a and an integral cylindrical member 80b. A similar fittting 85 slidably encompasses the cable 71 and is interposed adjacent fittings 77 between the same and pressed fitting 72a. Compression springs 90 are interposed between each of the fixed fittings 77 and 72a and the slidable fittings 80 and thereby permit both the adjustment in the size of the sway brace loops 76 and an adjustment in the divergence of these loops 76. In other words, compression of the springs 90 engaging and surrounding the sway brace loops will permit a larger loop to be formed while compression of the spring below fittings 77 will permit the aforesaid loops to be positioned more divergently in the instance of the use with sway braces of the type positioned further apart. As clearly indicated in FIGS. 1 and 2, the sway brace loops 76 are positioned about each of the sway braces 25 with the springs 90 maintaining a relatively tight engagement of the loops with the braces. The jettison cable 57 is passed through ring 74. Upon ejection of the container 10 from the rack 23 secured to the aircraft and downward movement of the container therefrom, a tripping or pulling force will be exerted on the jettison cable 57 thereby initiating the release and deployment of the nose cone and parachute assembly since the trip cable device 70 is maintained in its fixed relationship with respect to the ejector 23. The jettison cable is pulled out of engagement with the cable hook 55c, as indicated in FIG. 6b, and continued downward movement of the container will cause the jettison cable end to pass through the ring 74 whereby the cable will be retained on the container by reason of the fixed connection with eyelet 58. The short trip cable assembly 70 is retained on the ejector rack.

Obviously, many modifications and variations of the present invention are possible in light of the above teaching. It is, therefore, to be understood that, within the scope of the appended claims the invention may be practiced otherwise than as specifically described.

What is claimed is:

1. In an ejection cargo container for dropping material to the ground from an airborne vehicle by a deployable aerodynamic decelerator in which the decelerator is attached to and housed within the container at one end thereof and wherein a decelerator enclosing cap is releasably ejectable from the container upon ejection of the container from the vehicle, the improvement comprising:
    locking means cooperating with and carried by said container and said cap for holding said cap when in a locked position and ejecting said cap when moved to an unlocked position,
    cable means anchored at one end thereof to said container and releasably secured at the other end thereof to said locking means,
    and tripping means secured to the airborne vehicle at one end thereof and slidably and releasably secured to said cable means at the other end thereof for unlocking and ejecting said cap from the container and thereby deploying the decelerator when the container is ejected from the airborne vehicle.

2. The invention as defined in claim 1 wherein the airborne vehicle includes means for forcibly ejecting said container from said vehicle and wherein said container further includes:
    fin means at one end thereof for stabilizing said container during free flight thereof immediately after ejection and prior to deployment of the decelerator,
    and hardback means on said container for resisting the forces of the ejector means.

3. The ejectable cargo container as defined in claim 1 wherein said container includes:
    A central body portion formed of two equal semicircular segments hingedly connected at the longitudinal edges thereof,
    nose means secured to one end of said body portion for absorbing the shock when said container engages the ground,
    and cap means releasably and ejectably secured to the other end of said body portion for surrounding the decelerator.

4. The assembly as defined in claim 3 wherein said decelerator includes:
    a main parachute connected to said other end of said container,
    sleeve means encompassing said main parachute for withdrawal therefrom and for thereby incrementally deploying said main parachute,
    a pilot chute connected to said sleeve means for withdrawing said sleeve means from said main parachute,
    and means interconnected between said cap means and said pilot chute for withdrawing said pilot chute from said container when said cap is released and ejected from said container.

5. The assembly as defined in claim 4 wherein said cap means includes:
    a spring means within said cap means for compressedly engaging said decelerator when said cap means is locked to said container and for ejecting said cap means from said container when said locking means is moved to the unlocked position.

6. The assembly as defined in claim 4 wherein said container further includes:
    safety means for precluding deployment of said decelerator upon inadvertent removal of said cap means from said container.

7. The assembly as defined in claim 6 wherein said safety means includes:
 a plurality of radially extending flexible straps encompassing said decelerator and having one end thereof attached to said container,
 the other end of each of said flexible straps being formed with complementary locking means for releasably maintaining said flexible straps about said decelerator,
 and pin means engageable with said complementary locking means for releasing said safety device and permitting deployment of said decelerator when said container is ejected from said airborne vehicle.

8. A cargo container as defined in claim 7, and wherein said locking means includes:
 a latch block rigidly secured to said cap and having a lug transversely extending therefrom,
 a lever trip arm connected to said container and pivotal between a locked and unlocked position,
 lug-engaging hook means formed as part of said lever arm for engaging said lug when said lever arm is in the locked position,
 camming surface means adjacent said lug engaging hook means for engaging said latch block and for camming said cap away from said container when said lever arm is moved to the unlocked position,
 cable hook means formed as part of said lever arm for releasably coupling said cable means thereto,
 a safety-release cable secured to said lever arm at one end thereof and secured to said pin means at the other end thereof for releasing said safety device upon movement of said lever arm to the unlatched position,
 and spring means yieldingly retaining said lever arm in the latched position.

9. The assembly as defined in claim 1 and wherein said tripping means includes:
 a first adjustable cable loop and a second adjustable cable loop interconnected with said first cable loop, each of said cable loops being formed for connection to the airborne vehicle,
 ring means interconnected with said cable loops and including an aperture therethrough through which said cable means passes.

10. An adjustable harness, comprising:
 a cable turned back upon itself intermediate of its ends to form a first doubled length, the end portions of said cable being turned back upon themselves to form second and third doubled lengths with the ends of said cable being secured to their adjacent cable portions;
 a first helical spring secured at one end thereof around said first double length near the turned portion thereof and forming thereby an end loop with said cable, the first doubled length of said cable being extended through the entire length of said first spring; and
 second and third helical springs each secured at one end thereof to its respective secured end of said cable, the second and third double lengths being extended respectively through the entire length of said second and third springs and other ends of said springs being terminated short of the turned portions of the second and third cable lengths.

11. An adjustable harness, comprising:
 a cable turned back upon itself intermediate of its ends to form one double length, and at least one of the end portions of said cable being turned back upon itself to form another double length with the end of said cable being secured to its adjacent cable portion;
 a first helical spring secured at one end thereof around said first doubled length near the turned portion thereof and forming thereby an end loop with said cable, the first doubled length of said cable being extended through the entire length of said first spring; and
 a second helical spring secured at one end thereof to the secured end of said cable, the other double length being extended through the entire length of said second spring and the other end of said second spring being terminated short of the turned portion of the other cable length.

References Cited by the Examiner
UNITED STATES PATENTS

| | | | |
|---|---|---|---|
| 2,501,559 | 3/1950 | Winzen et al. | 244—138 |
| 2,776,808 | 1/1957 | Vonderahe | 244—138 |
| 3,188,130 | 6/1965 | Pietrowicz | 294—74 |

MILTON BUCHLER, *Primary Examiner.*

A. E. CORRIGAN, *Assistant Examiner.*